United States Patent [19]

Zenbutsu et al.

[11] 4,079,032

[45] Mar. 14, 1978

[54] PROCESS FOR PRODUCING UNBURNED BASIC REFRACTORIES

[75] Inventors: Tadashi Zenbutsu; Hajime Asami, both of Bizen; Seiichi Uemura, Kawasaki; Takao Hirose, Kamakura, all of Japan

[73] Assignees: Shinagawa Refractories Co., Ltd.; Nippon Oil Co., Ltd., both of Tokyo, Japan

[21] Appl. No.: 587,969

[22] Filed: Jun. 18, 1975

[30] Foreign Application Priority Data

Jun. 24, 1974 Japan .................................. 49-71376

[51] Int. Cl.$^2$ ................................................ C08K 3/36
[52] U.S. Cl. ................................... 260/42.43; 106/61; 526/218; 526/290
[58] Field of Search .................. 260/82, 42.43; 106/61

[56] References Cited

U.S. PATENT DOCUMENTS

| | | | |
|---|---|---|---|
| 2,910,748 | 11/1959 | Hamner et al. ..................... 260/82 X |
| 3,070,570 | 12/1962 | Gessler et al. ..................... 260/890 X |
| 3,318,840 | 5/1967 | Weston ............................. 260/42.43 |
| 3,330,890 | 7/1967 | Holt et al. ....................... 260/42.43 X |
| 3,406,156 | 10/1968 | Aldridge et al. ..................... 260/82 |
| 3,483,012 | 12/1969 | Young ............................... 106/61 X |
| 3,639,366 | 2/1972 | Braca et al. ............................ 260/82 |
| 3,709,854 | 1/1973 | Hepworth et al. ..................... 260/82 |
| 3,763,125 | 10/1973 | Moody et al. ....................... 260/82 X |

*Primary Examiner*—Sandra M. Person
*Attorney, Agent, or Firm*—Birch, Stewart, Kolasch and Birch

[57] ABSTRACT

A process for producing unburned basic refractories wherein a binder is added and kneaded with a basic refractory material and the kneaded mixture is press-formed. The binder is a thermoplastic resinous material which is obtained by removing a light fraction having a boiling point of less than 200° C under a reduced pressure of 100 mmHg and having a benzene-insoluble fraction content of less than 10% by weight from at least one member selected from the group consisting of a heavy oil obtained by a steam cracking of petroleum and a polymerization product of said heavy oil. The slag penetration resistance, slag erosion resistance and slaking resistance of the given unburned basic refractories are substantially improved.

16 Claims, No Drawings

PROCESS FOR PRODUCING UNBURNED BASIC REFRACTORIES

BACKGROUND AND SUMMARY OF THE INVENTION

The present invention relates to a process for producing unburned basic refractories.

Various unburned basic refractories of magnesite type, dolomite type and the like have heretofore been applied to a converter, a torpedo car and other furnaces. With the development of a steel making process using an L. D. converter, a steel of higher quality has been obtainable at a low cost. However, the refractory used in the converter is corroded and/or eroded by molten steel and slag, and as a result the durability of the refractory is decreased. Therefore, it is very important that the durability of the refractory is allowed to increase.

It has been known heretofore that carbonaceous substances show a strong resistance against wetting and penetration of molten steel and slag and therefore various binders with a high fixed carbon content have been developed. A binder for refractories must satisfy various conditions wherein not only the fixed carbon content is high, but also no atmosphere contamination occurs during its use. Also, the price should be inexpensive the boiling range should be larger and the strength of the green body as a binder should be sufficiently strong.

Typically, a coal tar pitch has been hitherto used due to the fact that the above-mentioned conditions are substantially satisfied. However, coal tar pitch contains a large amount of nitrogen- and oxygen-containing compounds which are harmful to human beings and for this reason many serious sanitary problems exist for workers at the time of producing or using the refractories. Therefore, it is desirable to obtain a substitute for the coal tar pitch which does not possess the above-mentioned disadvantages.

Under these circumstances, various attempts for the investigation of a substitute have been carried out. For example, there has been proposed for use resins which have a comparatively high fixed carbon content, such as liquid phenol resins, liquid furan resins and the like. However, these resins contain a large amount of unreacted components, for example the phenol resin contains phenol, formaldehyde and others and the furan resin contains furfuryl alcohol, furfural and others. Therefore, in these resins there is an offensive odor which is extreme, and the atmosphere contamination is excessive and, accordingly, care in handling these resins must be taken. Also, the moistureproof property of these resins is poor. Particularly, the dolomite refractories absorb moisture which is present in the air during the storaging of refractories and as a result slaking spots and cracks are generated which disintegrate the refractories. Due to these facts, it is desirable not to use these resins.

When the coal tar pitch is applied, the pitch is usually diluted with a solvent to facilitate workability in producing the refractories and accordingly it is necessary to use a creosote oil or an anthracene oil in view of the solubility of coal tar pitch. As a result, there is the disadvantage that such toxic solvents must be employed.

The object of the present invention is to provide a process for producing unburned basic refractories wherein the slag resistance and slaking resistance of unburned basic refractories are improved by using a new type of binder.

As a result of various investigations of thermoplastic resinous materials which are effective as binders for unburned basic refractories, according to the present invention, it has been found that by using a thermoplastic resinous material which is obtained by removing a light fraction having a boiling point of less than 200° C under a reduced pressure of 100 mmHg and having a benzene-insoluble fraction content of less than 10% by weight from a heavy oil obtained by the steam cracking of petroleum, or from the polymerization product of said heavy oil in the presence or absence of a catalyst or from a mixture of said heavy oil and said polymerization product, the above-mentioned disadvantages are eliminated and unburned basic refractories having the same or greater durability than that of products which are obtained by using the prior art binders of coal tar pitch or resins are obtained.

Therefore, the present invention is directed to a process for producing unburned basic refractories in which a binder is added and kneaded with a basic refractory material and the kneaded mixture is pressformed, characterized in that the binder is a thermoplastic resinous material which is obtained by removing a light fraction having a boiling point of less than 200° C under a reduced pressure of 100 mmHg and having a benzene-insoluble fraction content of less than 10% by weight from at least one member selected from the group consisting of a heavy oil obtained by the steam cracking of petroleum and a polymerization product of said heavy oil.

The thermoplastic resinous material according to the present invention has characteristic properties wherein the fixed carbon content is high and the benzene-insoluble fraction content is very low.

It has been considered that in the prior art binders the amount of $\beta$-resin in which a quinoline-insoluble fraction is removed from a benzene-insoluble fraction must be increased, and that the carbonization percentage of the binder and the physical properties of the carbon product become excellent with an increase in the amount of the $\beta$-resin.

On the contrary, however, the thermoplastic resinous material according to the present invention contains a very low benzene-insoluble fraction and substantially none of the quinoline-insoluble fraction, and despite these facts the fixed carbon content is very high. Therefore, the thermoplastic resinous material, according to the present invention, shows good characteristics equal to or superior to the coal tar pitch.

In addition, the properties of the binders, especially the melt viscosity must be controlled properly according to the performance of the kneader. In this case, various kinds of solvents can be applied to the thermoplastic resinous material according to the present invention which contains a very low content of the benzene-insoluble fraction. Petroleum solvents, such as for example, 70 pale oil, lube oil fractions such as SAE 10, 20 and 30, bright stock, and heavy fuel oil can be preferably applied to the present invention, in spite of the fact that they are not able to be used in the case of coal tar pitch. Thus, the above-mentioned disadvantages can be eliminated.

The solubilities of the thermoplastic resinous material according to the present invention and coal tar pitch into B heavy fuel oil which is one of petroleum solvents, was investigated. The results are shown in Table 1.

Table 1

| Sample | I<br>Thermoplastic resinous material obtained as residue by steam cracking of gas oil. Fraction with boiling point of more than 250° C/100mmHg | II<br>Thermoplastic resinous material obtained by heat-treating at 400° C the residue obtained by steam cracking of gas oil | III<br>Hard tar pitch |
|---|---|---|---|
| Softening point (° C) | 100 | 110 | 82 |
| Conradson carbon (% by wt.) | 40 | 49 | 53 |
| Benzene-insoluble fraction (% by wt.) | 3 | 16 | 35 |
| Quinoline insoluble fraction (% by wt.) | 0 | 0.2 | 7 |
| State of* mixture | Completely and uniformly dissolved | Insoluble particles are separated to give a suspension and are precipitated on standing | Separation of two layers occurs and the two components are scarcely dissolved in each other |

*Sample is mixed with B heavy fuel oil in the ratio 1:1 (by wt.) and the resultant mixture is heated at 150° C.

From these results it is clear that the thermoplastic resinous materials which are used according to the present invention have a superior function and effect relative to the prior tar pitch product with respect to solvent compatibility. Therefore, a complete impregnation can be realized.

The thermoplastic resinous material which may be used according to the present invention is one which contains less than 10% by weight of benzene-insoluble fraction and which is obtained by removing a light fraction having a boiling point of less than 200° C under a reduced pressure of 100 mmHg and having benzene-insoluble fraction content of less than 10% by weight from a heavy oil obtained by the steam cracking of petroleum, for example naphtha, kerosene, gas oil or a mixture of these petroleum hydrocarbons at about 700° to 1,000° C or obtained from the polymerization product of said heavy oil in the presence or absence of a catalyst or from the mixture of said heavy oil and said polymerization product.

Without removing light fractions with boiling points of less than 200° C, under a reduced pressure of 100 mmHg, inflammable gases will be liberated during the time of producing unburned basic refractories from said thermoplastic resinous material which may cause a fire. Furthermore, light fractions vaporize in a very short time while said kneaded clinker is press formed and burned at 300° to 400° C which results in cracks in the final products and a decrease in durability.

The polymerization of said heavy oil can be carried out in the absence of a catalyst, but it is preferable to use a catalyst when said heavy oil is polymerized. As examples of the catalyst, there can be mentioned the salts of iron, tin, aluminium or zinc, such as for example the chloride and nitrate parts of said metals, and a free radical polymerization catalyst, such as for example benzoylperoxide and azobisisobutyronitrile. An oxidative polymerization using oxygen or oxygen-containing gases or oxygen-liberating compounds can be also adopted. The reaction temperature is suitably selected from room temperature to 350° C depending upon the particular catalyst utilized. In case an oxidative polymerization is conducted a temperature of 200° to 300° C is preferably selected. On the other hand, the reaction pressure is preferable either at normal pressure or a pressure higher than normal pressure. The reaction time may be freely selected according to the desired properties of the polymerization product.

The thermoplastic resinous material which is used in the present invention must satisfy the above-mentioned physical properties as a binder. For this reason it is preferable to use a thermoplastic resinous material which has a softening point of 70° to 120° C, a melt viscosity at 250° C of less than 1,000 centipoise, a fixed carbon content (Conradson carbon) of 30 to 60% by weight and also a benzene-insoluble fraction content of less than 10% by weight, preferably less than 5% by weight. If the softening point is too low, the fixed carbon content decreases and the strength of the green body is poor and consequently it can not withstand use. On the other hand, if the softening point is too high, the thermoplastic resinous material must be diluted with a large amount of suitable solvent (cutback) and as a result cracks and a decrease in durability of the product occur.

The thermoplastic resinous material is preferable add in an amount of 3 to 10% by weight based on normal raw refractory materials. In this case, when an amount is less than 3% by weight is added, the porosity of the refractories increases, the strength decreases, a sufficient fixed carbon content can not be obtained and thus there is no realization of the desired slag resistance. On the other hand, an amount more than 10% by weight is added, the press-forming efficiency of the body decreases because the body to be formed is adhered to a forming press dies at the time of pressing.

As examples of refractory materials which may be used according to the present invention, there are mentioned the dolomite type, a dolomite clinker, a synthetic magnesite-dolomite clinker; the magnesia types, a concretely sea water magnesia clinker, an electrofused magnesia clinker and natural magnesite. According to the necessary purpose, anyone of these types of refractory materials or a dolomite-magnesia mixture type can be used. Further, a minor amount of carbon or graphite can be also added to the refractory material in order to increase a carbon content in the refractories. It is preferable to adopt a refractory material having a particle size of less than about 5 mm in order to suitably regulate the porosity of final product.

The refractory material and the binder are kneaded in a normal heat-kneading machine to produce a body for press-forming. The kneading temperature is defined depending upon the softening point and the melt viscosity, and in particular it is preferably a temperature at which thermal decomposition of the binder does not occur, for example less than 250° C. The melt viscosity depends upon the ability of the kneading machine, and is preferably less than 1,000 centipoise and it is also possible to dilute the body to be kneaded with a lubricating oil fraction or a heavy oil in order to regulate the viscosity.

The present invention is illustrated by the following examples.

EXAMPLE 1

40 parts by weight of dolomite clinker coarse grains having a particle diameter of 0.7 to 4.76 mm were previously heated at 130° C and then 6 parts by weight of thermoplastic resinous material (softening point: 100° C; melt viscosity at 180° C: 600 centipoise; Conradson carbon: 40 parts by weight; benzene-insoluble fraction content: 3% by weight; quinoline-insoluble fraction content: substantially 0% by weight) were added thereto after previously being heated to 180° C. Said thermoplastic resinous material was obtained as a residue by the steam cracking of gas oil, followed by distilling off the lighter fraction at 250° C under 100 mmHg.

The obtained mixture was kneaded in a heat-kneading machine at about 130° C, and then to the kneaded product was added 60 parts by weight of fine magnesia clinker grains having particle diameter of less than 0.7 mm with further sufficient kneading.

After the completion of kneading, the kneaded product was immediately formed in a press under the pressure of 1,000 kg/cm² without cooling the kneaded product, and the press-formed body was subjected to a baking treatment at 350° C for 10 hours. The slag penetration resistance, slag erosion resistance and slaking resistance of the obtained unburned basic refractory brick were evaluated. The results of the evaluation are shown in Table 2.

EXAMPLE 2

Example 1 was repeated under same conditions as described in Example 1 except that there was applied as a binder the thermoplastic resinous material (softening point: 73° C; melt visiosity at 180° C: 260 centipoise; Conradson carbon: 42% by weight; benzene-insoluble fraction content: 6.7% by weight; quinoline-insoluble fraction content: 0.2% by weight) which was obtained by reacting the residue obtained by the steam cracking of naphtha, at 370° C for 4 hours, followed by distilling off the fraction having an initial boiling point of 250° C under a pressure of 100 mmHg.

The evaluated results are shown in Table 2.

COMPARATIVE EXAMPLE 1

For the purpose of comparison, using as a binder a prior coal tar pitch (85 parts by weight of medium soft pitch were diluted with 15 parts by weight of creosote oil) an unburned basic refractory brick was produced by kneading, press-forming and baking treating under same conditions as described in example 1 and the obtained unburned basic refractory brick was evaluated. The evaluated results are shown in Table 2.

Table 2 shows that the product using a binder according to the present invention is superior in comparison with the prior art product.

Table 2

| | | Example 1 | Example 2 | Comparative example 1 |
|---|---|---|---|---|
| Bulk specific gravity | | 2.96 | 2.95 | 2.96 |
| Slag[1] erosion test | Eroded volume percentage (%) | 2.0 | 2.2 | 2.5 |
| | Maximum erosion depth (mm) | 2.0 | 2.3 | 2.8 |
| | Maximum penetration depth (mm) | 2.5 | 2.8 | 3.0 |
| Slaking[2] resistance | After 1 day | No change | No change | No change |
| | After 2 days | No change | No change | Slaking spot occurrence |
| | After 4 days | Slaking spot occurrence | Slaking spot occurrence | Slaking spot increase |
| | After 6 days | Slaking spot increase | Slaking spot increase | Slaking spot increase and partial crack occurrence |

[1] Using an oxygen-acetylene rotary slag erosion test machine, a slag erosion test was carried out by applying a converter slag to the test machine at 1,650° C for 4 hours.
[2] The slaking resistance was evaluated by an observation of appearance after the lapse of a prescribed day in an atmosphere maintained at 30° C and under a relative humidity of 80%.

The eroded volume percentage, maximum erosion depth and maximum penetration depth were respectively expressed as follows:

Eroded volume percentage = $\frac{\text{Eroded volume}}{\text{Original volume}} \times 100$ (%)

Maximum erosion depth — Maximum depth of the recess which was formed by a slag erosion (mm)

Maximum penetration depth — Maximum depth of the slag penetration layer (mm)

EXAMPLE 3

60 parts by weight of magnesia clinker coarse grains having a particle diameter of 0.7 to 4.76 mm were previously heated at 120° C and then 4 parts by weight of thermoplastic resinous material (softening point: 70° C; melt viscosity at 150° C: 950 centipoise; Conradson carbon: 35% by weight, benzene-insoluble fraction content: 2% by weight; quinoline-insoluble fraction content: substantially 0% by weight) were added thereto after previously being heated to 160° C. Said thermoplastic resinous material was obtained by polymerizing the residue obtained by the steam cracking of gas oil in the presence of AlCl₃ as catalyst with the addition of oxygen at 200° C, followed by distilling off the lighter fraction at 250° C under a pressure of 100 mmHg.

The obtained mixture was kneaded in a heat-kneading machine at about 120° C, and then to the kneaded product was added 30 parts by weight of magnesia clinker fine grains having a particle diameter of less than 0.7 mm and also 10 parts by weight of fine graphite grains having a particle diameter of less than 0.3 mm with further sufficient kneading.

After the completion of kneading, the kneaded product was immediately formed in a press under a pressure of 1,000 kg/cm² without cooling the kneaded product, and the press-formed body was subjected to a baking treatment at 300° C for 10 hours.

The slag penetration resistance of the obtained unburned basic refractory brick was evaluated.

The results of the evaluation are shown in Table 3.

EXAMPLE 4

Example 3 was repeated under the same conditions as described in Example 3 except that there was applied as a binder the thermoplastic resinous material (softening point: 82° C; melt viscosity at 180° C: 290 centipoise; Conradson carbon: 37% by weight; benzene-insoluble fraction content: 4.3% by weight; quinoline-insoluble fraction content: 0.1% by weight) obtained by distilling at 240° C under 100 mmHg the residue obtained by the steam cracking of gas oil and the thermoplastic resinous material obtained by reacting at 380° C for one hour the residue obtained by the steam cracking of naphtha in the ratio of 1:1 (by weight).

The evaluated results are shown in Table 3.

COMPARATIVE EXAMPLE 2

For the purpose of comparison, using as a binder coal tar pitch [diluted pitch (weight ratio): medium soft pitch/anthracene oil = 85/15], an unburned basic refractory brick was produced by kneading, forming and baking under same conditions as described in example 3 and the obtained fire brick was evaluated. The results of the evaluation are shown in Table 3.

From Table 3, it is clear that the unburned basic fire brick obtained by using the thermoplastic resinous material according to the present invention is superior in comparison with the prior art product.

Table 3

| | | Example 3 | Example 4 | Comparative example |
|---|---|---|---|---|
| Bulk specific gravity | | 2.90 | 2.90 | 2.90 |
| Slag erosion test | Eroded volume percentage (%) | 1.0 | 1.0 | 1.5 |
| | Maximum erosion depth (mm) | 0.6 | 0.7 | 0.9 |
| | Maximum penetration depth (mm) | 2.0 | 2.1 | 2.4 |

What we claim is:

1. A process for producing unburned basic refractory which comprises adding a binder to a basic refractory material, said binder being present in an amount of 3–10% by weight based on the normal raw refractory material, kneading the mixture, and then press-forming the kneaded mixture, wherein the binder is a thermoplastic resinous material having a benzene-insoluble fraction content of less than 10% by weight, which is obtained by removing a light fraction having a boiling point less than 200° C under a reduced pressure of 100 mm Hg from at least one member selected from the group consisting of a heavy oil obtained by the steam cracking of petroleum and a polymerization product of said heavy oil.

2. A process as claimed in claim 1, wherein the basic refractory material is selected from the group consisting of dolomite, synthetic magnesite-dolomite, sea water magnesia, electrofused magnesia, natural magnesia clinkers and mixtures thereof.

3. A process as claimed in claim 1, wherein the basic refractory material is added with a minor amount of carbon.

4. A process as claimed in claim 1, wherein the basic refractory material is added with a minor amount of graphite.

5. A process as claimed in claim 1, wherein the petroleum is selected from the group consisting of naphtha, kerosene, gas oil and mixture thereof.

6. A process as claimed in claim 1, wherein the steam cracking of the petroleum is carried out at a temperature of about 700° C to 1,000° C.

7. A process as claimed in claim 1, wherein the polymerization of the heavy oil is carried out in absence of a catalyst.

8. A process as claimed in claim 1, wherein the polymerization of the heavy oil is carried out in presence of a catalyst.

9. A process as claimed in claim 8, wherein the catalyst is a chloride or nitrate salt of a metal selected from the group consisting of iron, tin, aluminum and zinc.

10. A process as claimed in claim 8, wherein the catalyst is a free radical polymerization catalyst including benzoylperoxide and azobisisobutyronitrile.

11. A process as claimed in claim 8, wherein the catalyst is an oxidative polymerization catalyst which includes oxygen, an oxygen-containing gas and oxygen-liberating compounds.

12. A process as claimed in claim 1, wherein the thermoplastic resinous material has a softening point of 70°–120° C, a melt viscosity at 250° C of less than 1000 centipoises, and a fixed carbon content of 30–60% by weight.

13. A process as claimed in claim 1, wherein the benzene-insoluble fraction content is less than 5% by weight.

14. A process as claimed in claim 1, wherein the polymerization of the heavy oil is conducted at a reaction temperature of from room temperature to 350° C.

15. A process as claimed in claim 11, wherein the oxidation is conducted at a temperature of 200°–300° C.

16. A process as claimed in claim 1, wherein the refractory material has a particle size of less than 5 mm.

* * * * *